United States Patent [19]

Barnes

[11] Patent Number: 5,046,818
[45] Date of Patent: Sep. 10, 1991

[54] SIGNAL REFLECTOR AND OPTICAL SYSTEM

[75] Inventor: Josh T. Barnes, Charlevoix, Mich.

[73] Assignee: Lexalite Corporation, Charlevoix-the-Beautiful, Mich.

[21] Appl. No.: 373,941

[22] Filed: Jun. 29, 1989

[51] Int. Cl.[5] .......................... G02B 5/12; F21V 21/26
[52] U.S. Cl. ................................... 359/527; 362/269; 359/534; 359/515
[58] Field of Search ............................... 350/101–103, 350/167, 432, 104, 286; 362/224, 263, 341, 347, 337, 269

[56] References Cited

U.S. PATENT DOCUMENTS

| 563,836 | 7/1896 | Blondel et al. | |
|---|---|---|---|
| 1,447,500 | 3/1923 | Ainsworth | |
| 1,708,108 | 4/1929 | Rolph | |
| 2,029,929 | 2/1936 | Luce | 88/82 |
| 2,175,067 | 10/1939 | Rolph | 240/106 |
| 2,566,126 | 8/1951 | Franck | 240/106 |
| 2,686,255 | 8/1954 | Pascucci | 240/103 |
| 3,089,024 | 5/1963 | Odle | 240/25 |
| 3,160,350 | 12/1964 | Rex et al. | 240/106 |
| 3,283,140 | 11/1966 | Rex | 240/25 |
| 3,384,743 | 5/1968 | Little et al. | 240/81 |
| 3,398,273 | 8/1968 | Rex et al. | 240/93 |
| 3,398,274 | 8/1968 | Rex | 240/103 |
| 3,532,871 | 10/1970 | Shipman | 240/7.1 |
| 4,158,222 | 6/1979 | Cook | 350/432 |
| 4,173,037 | 10/1979 | Henderson, Jr. et al. | 362/287 |
| 4,563,730 | 1/1986 | Saito | 362/264 |
| 4,683,525 | 7/1987 | Camm | 362/346 |
| 4,839,781 | 6/1989 | Barnes et al. | 350/167 |

OTHER PUBLICATIONS

Institute of Transportation Engineers, "Vehicle Traffic Control Signal Heads", 1985, pp. 5–11.

Primary Examiner—Bruce Y. Arnold
Assistant Examiner—James Phan
Attorney, Agent, or Firm—Mason, Kolehmainen, Rathburn & Wyss

[57] ABSTRACT

An optical system is provided for traffic signal devices. The optical system includes an illuminating source for emitting light; a prismatic reflector for receiving and reflecting the emitted light; and a lens for receiving and for redirecting the reflected emitted light. The illuminating source and the reflector are aligned along a first axis that is vertically inclined relative to a central horizontal axis of the traffic signal device in a range between approximately 2 degrees and 4 degrees. The reflector has a substantially parabolic contour and has a plurality of substantially vertical critical angle prisms formed on an outside surface of the reflector. The prism have included angles of greater than 90 degrees but less than or equal to 95 degrees, or included angles of greater than or equal to 85 degrees but less than 90 degrees. The prisms are arranged to have included angles sequentially increasing from a first predetermined included angle proximate to the illumination source to a second predetermined included angle proximate to the lens. The traffic signal device includes a housing and the lens has an outer face spaced exterior from the housing allowing a portion of the reflector to extend within the lens outside the housing.

17 Claims, 6 Drawing Sheets

5,046,818

SIGNAL REFLECTOR AND OPTICAL SYSTEM

BACKGROUND OF THE INVENTION

1. Field of the Invention

The present invention generally relates to optical systems, and more particularly to an improved optical system for use with traffic signal devices.

2. Description of the Prior Art

Typically a traffic signal optical system includes a lamp, a lens and a reflector contained within a traffic signal housing. A conventional power specification or power rating for the lamp is directly related to the diameter of the lens. For example, a nominal power rating of 150 Watts is used for a 12 inch (300 mm) diameter lens and a nominal power rating of 60 Watts is used for a 8 inch (200 mm) diameter lens. The lamps most commonly used are 165 Watt and 67 Watt, incandescent standard 8,000 hour, providing 1950 and 625 initial lumens, respectively.

Conventional lenses are convex with smooth exterior and prismatic interior surfaces, pressed or molded of an appropriate color transmitting glass or plastic material. Due to the temperatures resulting from the required high power lamps, plastic lenses are formed of a high temperature resistant material, usually polycarbonate, rather than a more optically efficient acrylic.

Known reflectors typically are shallow parabolas, limited in depth by the relatively short available space behind a lens gasket on a signal door of the traffic signal housing. Conventional reflectors generally are formed of bright anodized aluminum and metalized polycarbonate, while some earlier reflectors were formed of silvered glass. A required controlled light output of approximately 600 lumens is provided by various known signal systems utilizing a 1950 lumens, 165 Watt incandescent lamp.

While known traffic signal devices provide generally satisfactory operations, it is desirable to provide an optical system for traffic signal devices having improved control of the emitted light for increasing the efficiency to achieve the required lumen output with significantly reduced power requirements. It is further desirable to provide such an optical system that reduces the sun phantom effect of known traffic signal devices. The sun phantom effect is the illusion that a signal face is illuminated when the sun's rays are nearly perpendicular to the face of the lens.

SUMMARY OF THE INVENTION

Among the principal objects of the present invention are to provide an optical system for traffic signal devices providing effective and efficient emitted light control; to provide such an optical system in which optimized power requirements are achieved and that utilizes a conventional type incandescent lamp; to provide such an optical system in which reduced sun phantom effect is achieved; and to provide such an optical system that overcomes many of the disadvantages of various types of traffic signal devices proposed in the past.

In brief, the objects and advantages of the present invention are achieved by an optical system for a traffic signal device comprising an illuminating source for emitting light; a reflector for receiving and reflecting the emitted light; and a lens for receiving and for redirecting the reflected emitted light. The illuminating source and the reflector are aligned along a first axis that is vertically inclined relative to a central horizontal axis of the traffic signal device in a range between approximately 2 degrees and 4 degrees.

In accordance with features of the present invention, the reflector has a substantially parabolic contour and has a plurality of substantially vertical critical angle prisms formed on an outside surface of the reflector. The prisms have included angles of greater than 90 degrees but less than or equal to 95 degrees, or included angles of greater than or equal to 85 degrees but less than 90 degrees. The prisms are arranged to have included angles sequentially increasing from a first predetermined included angle proximate to the illumination source to a second predetermined included angle proximate to the lens. The traffic signal device includes a housing and the lens has an outer face spaced exterior from the housing allowing a portion of the reflector to extend within the lens outside the housing.

BRIEF DESCRIPTION OF THE DRAWINGS

The present invention together with the above and other objects and advantages may best be understood from the following detailed description of the embodiment of the invention illustrated in the drawings, wherein.

DETAILED DESCRIPTION OF THE PREFERRED EMBODIMENT

Figure 1:
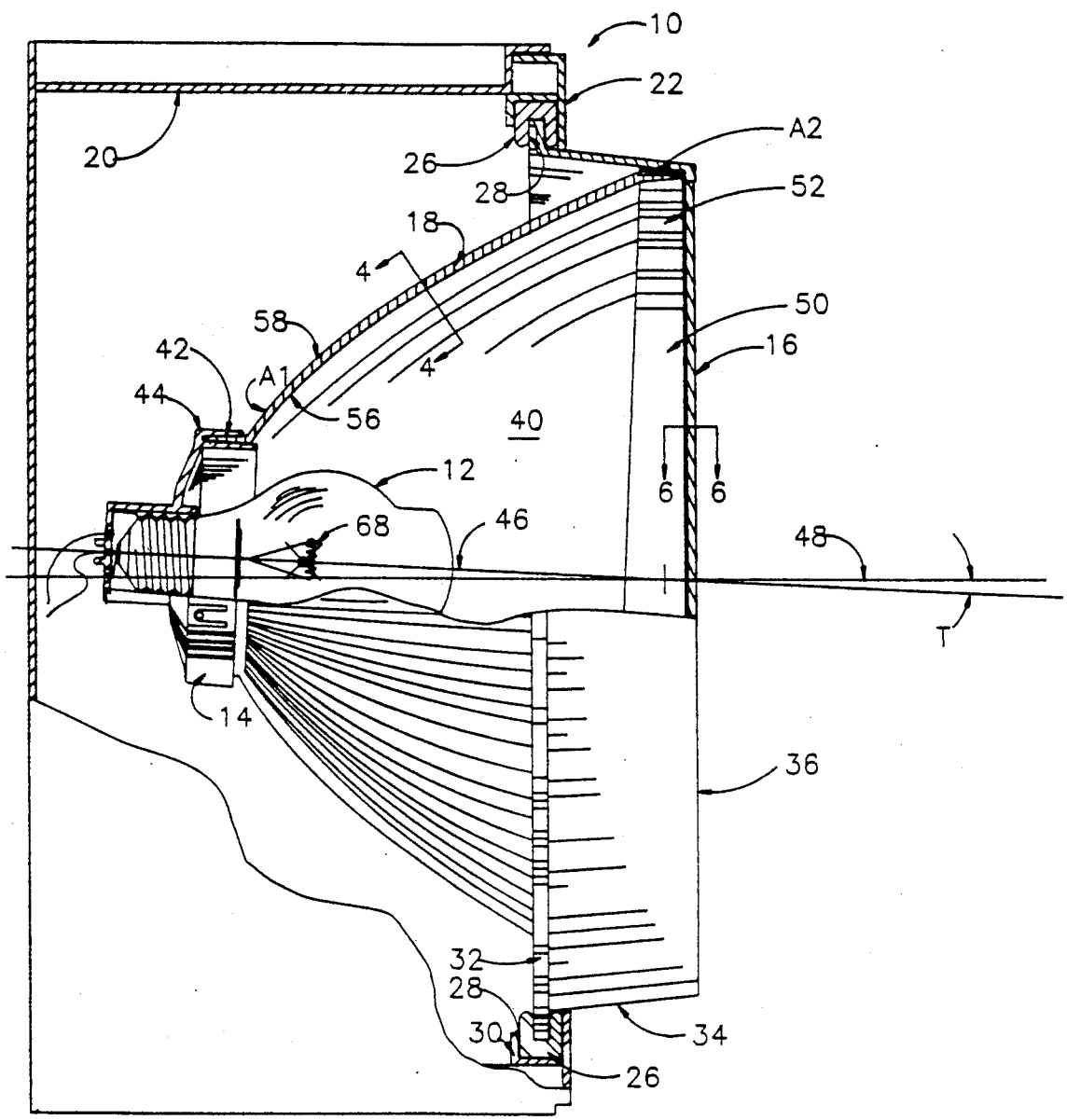
FIG. 1 is a side elevational view, partly broken away, of a signal reflector and optical system constructed in accordance with the invention.

Referring now to the drawings, in FIG. 1 there is illustrated a signal reflector and optical system constructed in accordance with the principles of the present invention and designated as a whole by the reference character 10. Although a single signal reflector and optical system 10 is illustrated for purposes of description, a traffic signal device may include a number, such as three, of similar systems. For example, each similar system 10 can be provided with a suitable colored lens for a selected colored output light including, such as red, green and yellow.

Among its major components, the signal reflector and optical system 10 includes an illumination source or lamp 12 secured in a lamp socket 14, a lens 16 adapted for lateral spreading and downwardly redirecting the emitted light and a reflector device 18 for receiving and reflecting light. The signal reflector and optical system 10 is adapted for providing effective and efficient emitted light control to achieve a required lumen output with significantly reduced power requirements for the lamp 12 and for reducing the sun phantom effect of conventional traffic signal devices.

Figure 2:
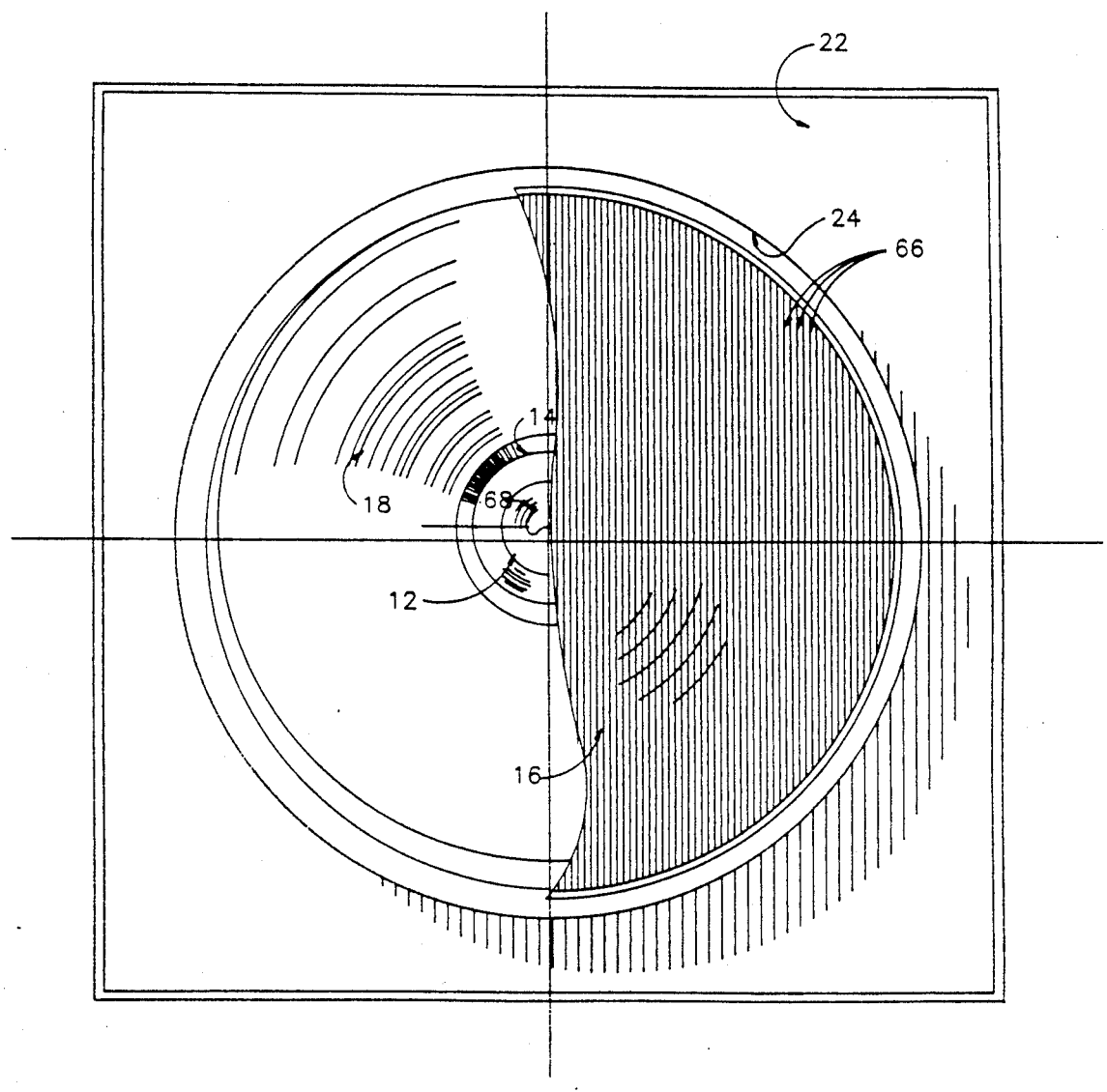
FIG. 2 is a front elevational view, partly broken away, of the signal reflector and optical system of FIG. 1.
Figure 3:
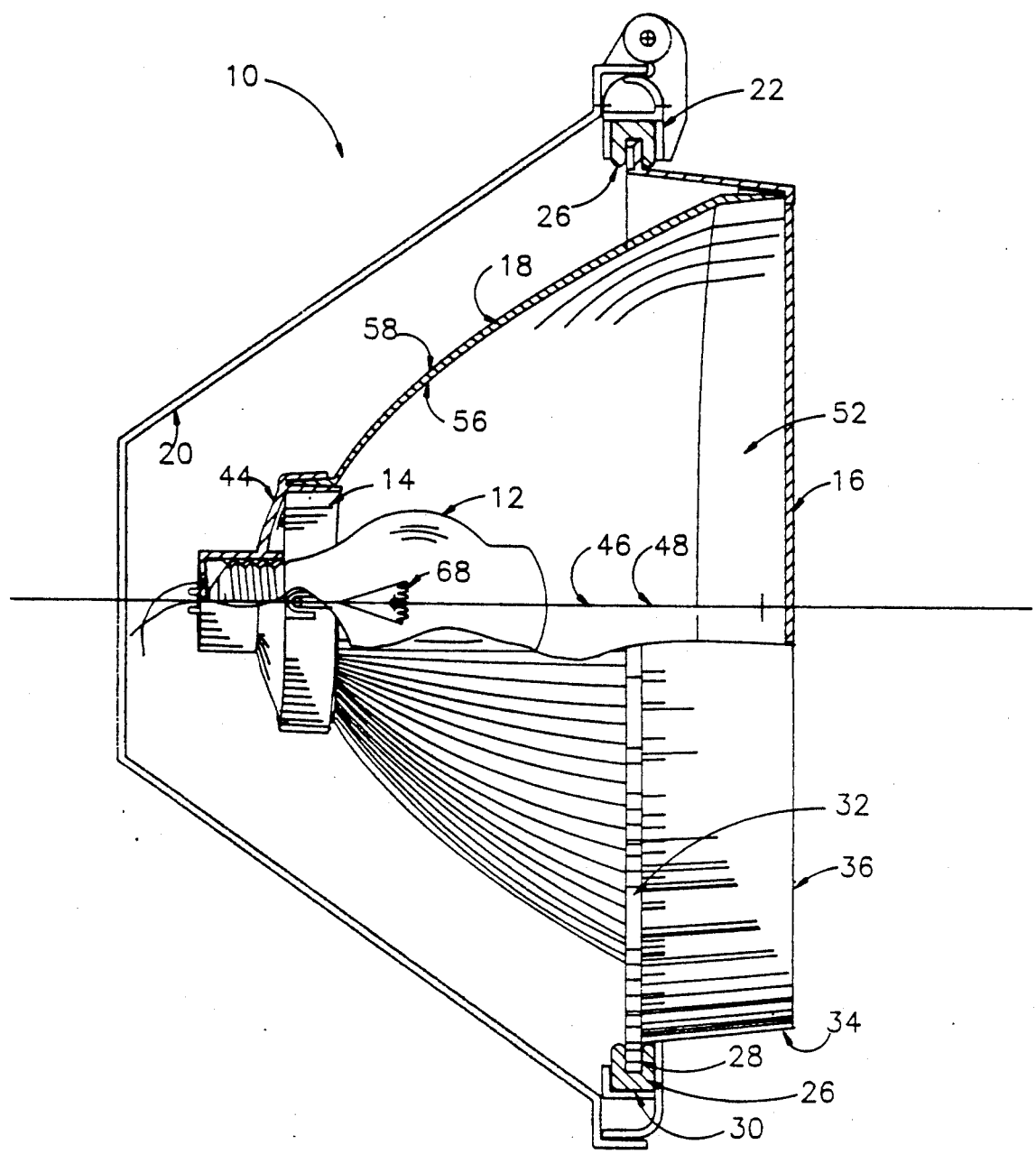
FIG. 3 is a top view, partly broken away, of the signal reflector and optical system of FIG. 1.

Referring to FIGS. 1-3, the signal reflector and optical system 10 includes a housing 20 having a hinged door 22 with a generally centrally disposed circular opening 24 formed in the door 22. A gasket 26 having a recessed channel 28 is press fit or otherwise securely mounted within a gasket-receiving housing portion 30 formed on the inside of housing door 22 adjacent the opening 24. Lens 16 has an overall pie pan configuration including a circular inside rim portion 32 received and retained within the gasket channel 28, an inclined wall 34 extending outwardly from the rim portion 32 and terminating at a circular outer lens face 36. The outer lens face 36 is spaced exterior from the housing a selected distance, for example, such as greater than one inch (1"), to facilitate a greater depth for the reflector 18 which extends within the lens 18 outside the housing 20. Preferably the outer lens face 36 and the rim portion 32 are disposed in spaced-apart parallel vertical planes, as shown, although it should be understood that a conventional type lens could be used with the reflector 18 being reconfigured to engage the conventional lens inside the housing 20.

Reflector 18 comprises a unitary body having a substantially parabolic contour and defining an interior cavity 40. Reflector 18 preferably is formed of a light transmitting synthetic resin material, such as, for example, an acrylic or similar material. Reflector 18 has a central circular cylindrical portion 42 interfitting between a clip 44 and the lamp socket 14 for receiving and positioning the lamp 12. Lamp 12 is positioned within the cavity 40 at the focal point of the reflector 18. The clip 44 is releasable engaged with the lamp socket 14 to facilitate removal of the socket 14 to replace the lamp 12 when required.

Figure 5A:
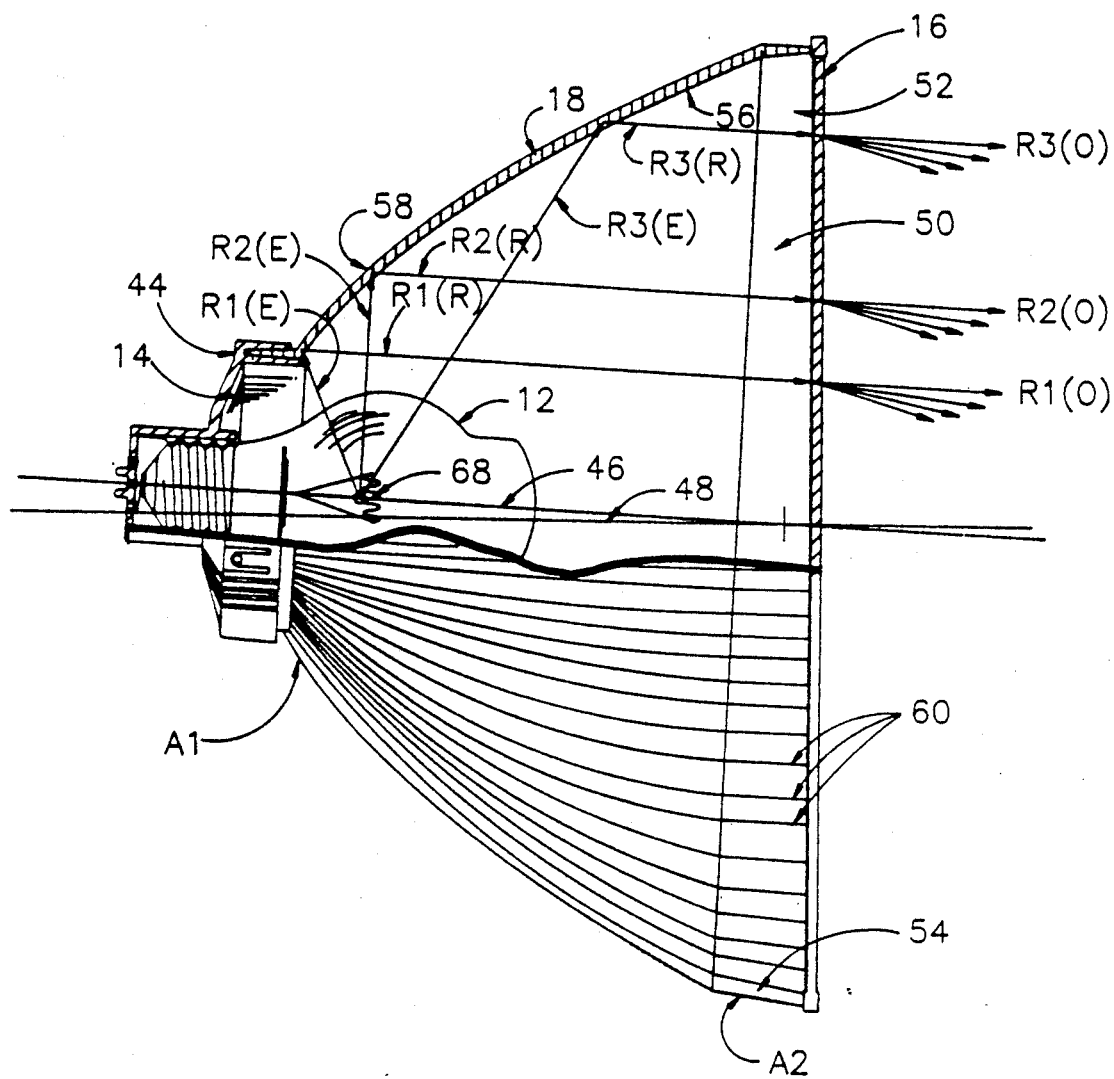
FIGS. 5A and 5B are similar views to FIG. 1 providing a graphical representation illustrating light control characteristics and sun phantom control of the signal reflector and optical system of FIG. 1, respectively.
Figure 5B:
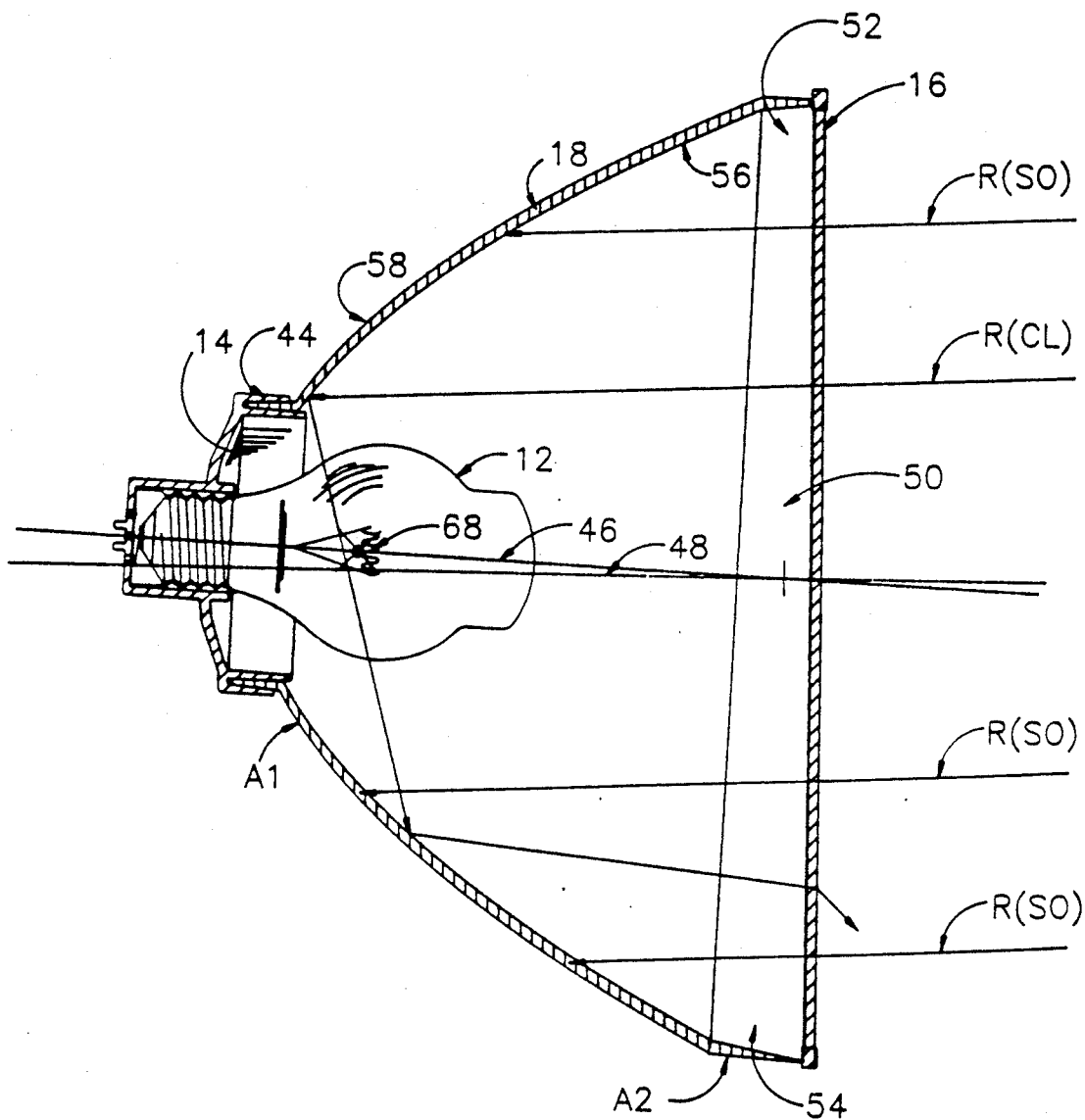

Reflector 18 together with the lamp 12 is disposed along a predetermined axis 46 which in the preferred arrangement is inclined relative to a central horizontal axis 48 of the housing 20. As described below, an appropriate vertical angle T, for example, such as, 2½ degrees, as shown, or in a range between approximately 1½ degrees and 5 degrees advantageously is provided between the axes 46 and 48. Reflector 18 has a distal band portion 50 for positional engagement with the inclined wall 34 of lens 16. Referring also to FIGS. 5A and 5B, the band portion 50 has a upper portion 52 having a first width gradually increasing to a second greater width at a lower portion 54 for holding the reflector 18 at the selected vertical angle T. Reflector 18 is anchored to the lens 16, for example, by adhesive bonding.

Figure 4:
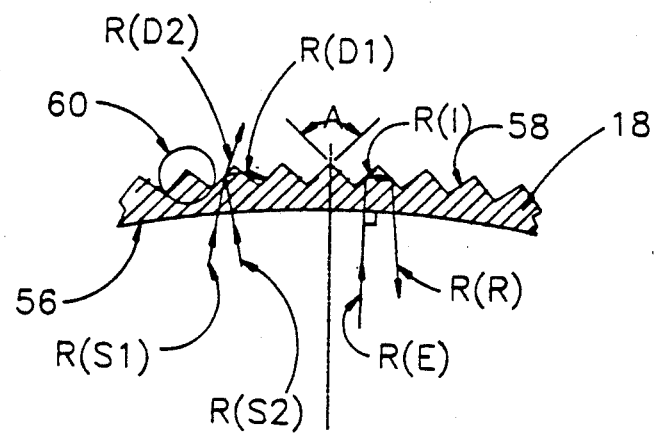
FIG. 4 is a fragmentary cross-sectional view taken along the line 4—4 of FIG. 1 illustrating typical critical angle prisms of a reflector device of the signal reflector and optical system.

Referring also to FIG. 4, an inside surface 56 of the reflector 18 is a smooth light receiving surface. An outside surface 58 of the reflector 18 is formed with a plurality of substantially vertical critical angle reflecting prisms 60. Critical angle reflecting prisms 60 consist of calculated curved and angled surfaces such that internal rays impinging thereon will be reflected or refracted as the incident angle is greater than or less than the critical angle of the transparent material (42.2 degrees for acrylic). Critical angle reflecting prisms that can be used for the prisms 60 are disclosed in U.S. Pat. No. 4,839,781 issued June 13, 1989 to Barnes et al. and assigned to the present assignee. The disclosure of this patent is incorporated herein by reference.

An included angle of the prisms 60 is designated by an (arrow) A in FIG. 4. Reflector 18 includes prisms 60 having included angles A of greater than 90 degrees but less than 95 degrees, or included angles A of greater than 85 degrees but less than 90 degrees. All of the prisms 60 can be provided with an identical included angle A, for example, of 90 degrees. With the reflector 18 disposed at the axis 46 vertically rotated between 1½ and 5 degrees relative to the central horizontal axis 48, the common 90 degree prism included angle A provides generally acceptable operation to avoid the sun phantom effect.

In the preferred embodiment, the prism 60 are arranged with sequentially increasing included angles from a first predetermined included angle A1, for example at 90 degrees, proximate to lamp 12 to a second predetermined included angle A2, for example at 94 degrees, proximate to the lens 16 as indicated in FIGS. 1, 5A and 5B. The combination of the sequentially increasing included angles from A1 to A2 with the reflector 18 disposed at the axis 46 vertically rotated from the central horizontal axis 48 provides improved operation and essentially eliminates all sun phantom effects.

In FIG. 5A, a graphical representation illustrates light control characteristics of the signal reflector and optical system 10. Typical light rays emitted by the lamp 12 are indicated by a plurality of lines R1(E), R2(E), and R3(E) in FIG. 5A shown as corresponding emitted light rays indicated by a line R(E) in FIG. 4. As shown in FIG. 4, these emitted light rays R(E) enter substantially normal to the inside surface 56 and pass through the reflector 18 substantially normal to the outside surface 58. The emitted light rays R1(E), R2(E), R3(E), R(E) are incident to a first face of the prisms 60 at angles slightly greater than the critical angle and are thus reflected as internal rays indicated by a line R(I) in FIG. 4. The reflected internal rays R(I) are substantially perpendicular to the original direction until the internal rays R(I) are incident with a second face of prisms 60 similarly at angles slightly greater than the critical angle and are thus again reflected indicated by lines R(R) in FIG. 4 and R1(R), R2(R), R3(R) in FIG. 5A. The reflected rays R1(R), R2(R), R3(R) are both vertically and laterally redirected by the critical angle prisms 60 and are substantially aligned with the desired output before further redirection is provided by the lens 16. The reflected rays R1(R), R2(R), R3(R) from the reflector 18 are substantially parallel to the reflector and lamp center axis 46 and continue until they are incident with the lens 16. Lens 16 provides further control including lateral spreading and downwardly or graduated depressing redirection to achieve the desired output rays indicated by lines R1(O), R2(O), R3(O).

Figure 6:
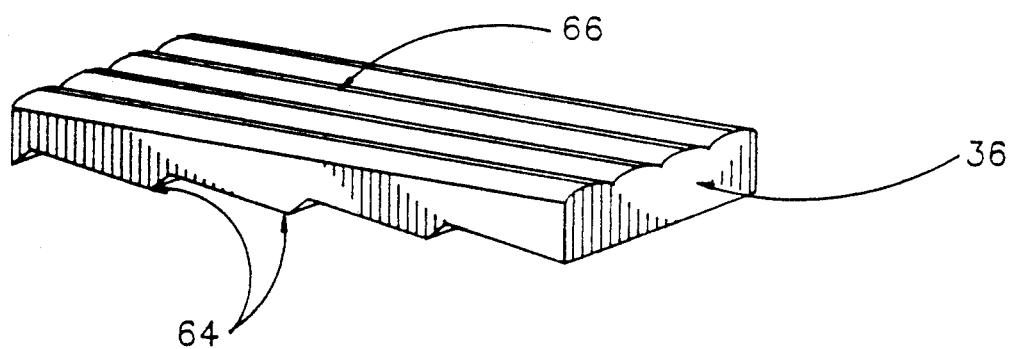
FIG. 6 is a greatly enlarged fragmentary cross-sectional view along the line 6—6 of FIG. 1.

Referring to FIG. 6, there is shown a greatly enlarged sectional view through the lens face 36. Lens face 36 can include lateral internal prisms 64 providing a graduated depressing redirection and vertical exterior prisms 66, as illustrated. Alternatively, the lens face 36 can include repetitive internal prisms providing both lateral spreading and graduated depressing redirection. Lens 16 can be formed of glass, polycarbonate, acrylic or various other light transmitting material having sufficiently high temperature characteristics for the particular lamp 12 used in the system 10.

FIGS. 4 and 5B illustrate the effective avoidance of the sun phantom effects provided by the signal reflector and optical system 10. Off axis sun rays R(SO) shown in FIG. 5B are incident to the lens 16 and travel through the lens and are incident to the reflector 18. FIG. 4 shows typical rays R(S1) and R(S2) incident at some significant angle to the inner surface 56 of the reflector 18 so that rays R(S1) and R(S2) are refracted toward the normal to surface 56. Ray R(S1) continues through the reflector 18 and is incident to a first face of prism 60 at an angle greater than the critical angle and is thus reflected as an internal ray. However, the reflected internal ray is incident to the second face of prism 60 at an angle less than the critical angle and is thus refracted and dispersed as R(D1), as shown. Ray R(S2) represents rays which are incident to the first face of prism 60 at an angle less than the critical angle and thus are immediately refracted and dispersed as R(D2).

Line R(CL) in FIG. 5B represents sun rays lying along a vertical plane through the axis 46 which fall within an acceptable angle to the reflective prisms 60 to be reflected within the optical system 10. However, such reflected rays will pass through the focal point of the parabolic reflector 18 only when sun rays R(CL) originated at a point coinciding with an extension of the axis 46. Because the sun cannot be seen at angles below the horizontal, such coincidence is not possible due to the inclined vertical angle T of the axis 46 of the reflector 18. A fraction of a degree would be sufficient for the angle T if the reflector 18 included prism included angles A such that no variation in incident angle would be acceptable to the prism 60; however, a light source of zero width would then be required.

Utilizing a lamp 12 having a relatively large filament 68 with the 2½ degree vertical rotation of the axis 46 of reflector 18, as illustrated, facilitates the use of prism included angles A within the range between 90 and 95 degrees for providing an adequate acceptance window for reflecting all incident rays from the lamp 12, while refracting and excluding substantially all direct rays from a low angle sun.

An incandescent standard 8,000 hour, 90 Watt lamp rated for 1,040 initial lumens can be used for lamp 12, although various other commercially available lamps can be employed. A controlled light output of approximately 600 lumens is provided by signal reflector and optical system 10 from the 1,040 lamp, while various known signal systems require a 1950 lumens, 165 Watt incandescent lamp to provide the 600 lumens output.

Additional advantages over various conventional signal systems provided by the signal reflector and optical system 10 include the following. The extension of the reflector 18 within the outwardly projecting lens 16 significantly decreases uncontrolled rays from the front of the lamp. The use of the reflector 18 with the critical angle prisms 60 significantly decreases specular reflection losses, for example, from 22% to 8% when compared with conventional bright anodized aluminum reflectors. Inclining the reflector 18 and the lamp 12 above the axis 48 of the lens 16 increases the effectiveness of the critical angle prisms 60 on the reflector 18 in avoiding sun phantom effects and decreases the refraction losses of the lens 16 by establishing the reflector beam coincident with the desired lens output vertical angle.

While the invention has been described with reference to details of the illustrated embodiment, these details are not intended to limit the scope of the invention as defined in the appended claims.

I claim:

1. A traffic signal device comprising:
    a housing;
    illuminating means for emitting light;
    lens means for receiving and for redirecting said reflected emitted light;
    reflector means for receiving and reflecting said emitted light; said reflector means having a substantially parabolic contour and having a portion extending proximate to said lens means; and
    said illuminating means and said reflector means being aligned along a first axis, said first axis being vertically inclined relative to a central horizontal axis of the traffic signal device in a range between approximately 2 degrees and 4 degrees.

2. An optical system for a traffic signal device as recited in claim 1 wherein said reflector means has an inside surface and an outside surface defining a substantially parabolic contour and said reflector means has a plurality of substantially vertical prism means formed on said outside surface for reflecting said emitted light; said prism means having included angles of greater than 90 degrees but less than or equal to 95 degrees, or included angles of greater than or equal to 85 degrees but less than 90 degrees.

3. An optical system for a traffic signal device as recited in claim 1 wherein said reflector means has an inside surface and an outside surface defining a substantially parabolic contour and said reflector means has a plurality of substantially vertical prism means formed on said outside surface for reflecting said emitted light; said prism means having included angles sequentially increasing from a first predetermined included angle proximate to said illumination means to a second predetermined included angle proximate to said lens means.

4. An optical system for a traffic signal device as recited in claim 1 wherein an outer face of said lens means is spaced at least one inch exterior from said housing.

5. An optical system for a traffic signal device as recited in claim 1 wherein said reflector means has a substantially parabolic contour, and said reflector means has a portion extending inside said lens means exterior from said housing.

6. An optical system for a traffic signal device as recited in claim 1 wherein said illumination means is disposed proximate to a focal point of said reflector means.

7. An optical system for a traffic signal device as recited in claim 1 wherein said reflector means is formed of a substantially transparent material.

8. A traffic signal device comprising:
    a light source for emitting light;
    a reflector surrounding and extending outwardly from said light source for receiving and reflecting said emitted light;
    lens means for receiving and for redirecting said reflected emitted light; said lens means has an outer face spaced exterior of traffic signal device
    said reflector comprising a prismatic reflector being formed of a substantially transparent material and having a plurality of substantially vertical prism means formed on an outside surface thereof for reflecting said emitted light; said reflector has a substantially parabolic contour and has an end portion extending inside said lens means exterior of said traffic signal device; said prism means having included angles sequentially increasing from a first predetermined included angle proximate to said light source to a second predetermined included angle proximate to said lens means; and
    said light source and said reflector being aligned along a first axis, said first axis being vertically inclined relative to a central horizontal axis of the traffic signal device in a range between approximately 2 degrees and 4 degrees.

9. An optical system for a traffic signal device as recited in claim 8 wherein said prism means have included angles of greater than 90 degrees but less than or equal to 95 degrees, or included angles of greater than or equal to 85 degrees but less than 90 degrees.

10. An optical system for a traffic signal device as recited in claim 8 wherein said light source and said reflector means are aligned along a first axis, said first axis being vertically inclined relative to a central horizontal axis of the traffic signal device in a range between approximately 2 degrees and 4 degrees.

11. A traffic signal device comprising:
a housing;
illuminating means for emitting light;
reflector means for receiving and reflecting said emitted light; said reflector means having a substantially parabolic contour;
lens means for receiving and for redirecting said reflected emitted light; said lens means having an outer face spaced a predetermined distance exterior from said housing;
said reflector means comprising a prismatic reflector having a plurality of substantially vertical prism means formed on an outside surface thereof for reflecting said emitted light and said reflector means including a portion thereof extending inside said lens means outside said housing; said prism means having included angles of greater than 90 degrees but less than or equal to 95 degrees, or included angles of greater than or equal to 85 degrees but less than 90 degrees; and
said illuminating means and said reflector means being aligned along a first axis, said first axis being vertically inclined relative to a central horizontal axis of the traffic signal device in a range between approximately 2 degrees and 4 degrees.

12. An optical system for a traffic signal device as recited in claim 11 wherein said prism means have included angles sequentially increasing from a first predetermined included angle proximate to said illumination means to a second predetermined included angle proximate to said lens means.

13. An optical system for a traffic signal device as recited in claim 11 wherein said outer face is spaced at least one inch exterior from said housing.

14. An optical system for a traffic signal device as recited in claim 11 wherein said illumination means is disposed proximate to a focal point of said reflector means.

15. An optical system for a traffic signal device as recited in claim 11 wherein said reflector means is formed of a substantially transparent acrylic material.

16. An optical system for a traffic signal device as recited in claim 13 wherein said lens means is aligned along said central horizontal axis of the traffic signal device.

17. An optical system for a traffic signal device as recited in claim 13 wherein said lens means is aligned along said first axis.

* * * * *

UNITED STATES PATENT AND TRADEMARK OFFICE
CERTIFICATE OF CORRECTION

PATENT NO. : 5,046,818

DATED : September 10, 1991

INVENTOR(S) : Barnes

It is certified that error appears in the above-identified patent and that said Letters Patent is hereby corrected as shown below:

Column 6, claim 8, line 53, a --;-- should be added after "device."

Signed and Sealed this

Twenty-second Day of December, 1992

*Attest:*

DOUGLAS B. COMER

*Attesting Officer*  *Acting Commissioner of Patents and Trademarks*